United States Patent [19]

Hughes

[11] 4,195,900

[45] Apr. 1, 1980

[54] TERMINAL HOUSING HAVING IMPROVED MOUNTING MEANS

[75] Inventor: Donald W. K. Hughes, Mechanicsburg, Pa.

[73] Assignee: AMP Incorporated, Harrisburg, Pa.

[21] Appl. No.: 22,741

[22] Filed: Mar. 22, 1979

[51] Int. Cl.[2] .......................... H02B 1/06; F16B 19/00

[52] U.S. Cl. .................................. 339/125 R; 85/5 R

[58] Field of Search ............... 339/125, 119, 126, 127, 339/128, 220, 221, 17 CF, 17 C, 217; 85/5 R, DIG. 2

[56] References Cited

U.S. PATENT DOCUMENTS

| | | | |
|---|---|---|---|
| 2,685,073 | 7/1954 | Damon | 339/217 S |
| 3,416,122 | 12/1968 | Kinkaid | 339/17 CF |
| 3,824,554 | 7/1974 | Shoholm | 339/221 R |

*Primary Examiner*—Joseph H. McGlynn
*Assistant Examiner*—John S. Brown
*Attorney, Agent, or Firm*—Frederick W. Raring

[57] ABSTRACT

Electrical connector which is intended for mounting on a circuit board comprises an insluating housing having a pair of mounting posts extending normally from the surface of the connector housing which is against the circuit board. Each post has a retaining portion which is adjacent to the surface of the housing, a lead-in portion, and a free end which is remote from the surface of the housing. The retaining portion comprises a semi-cylindrical portion having a retaining fin extending laterally therefrom. The fin has a first surface which extends tangentially from the cylindrical surface of the semi-cylindrical portion and a flat surface which extends from the outer edge of the fin to the flat surface of the semi-cylindrical portion. The lead-in portion of the post comprises the semi-cylindrical portion and a fin having an outer edge which slopes towards the free end of the post so that the fin has a decreasing cross-section as a distance from the housing surface increases. In use, the posts are inserted into circular holes in the circuit board and the fins are flexed and partially collapsed during insertion so that they bear against the surfaces of the holes and retain the housing on the circuit board.

9 Claims, 10 Drawing Figures

FIG. 1
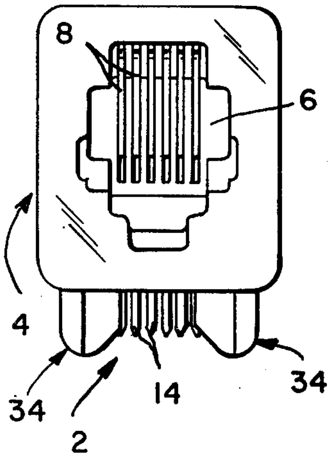
FIG. 2
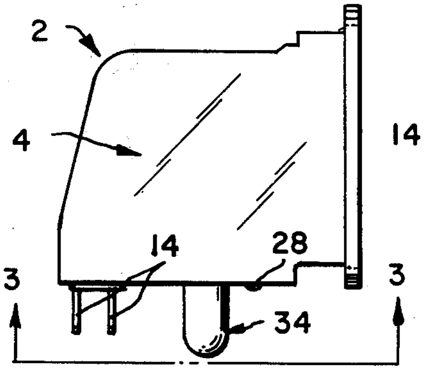
FIG. 3
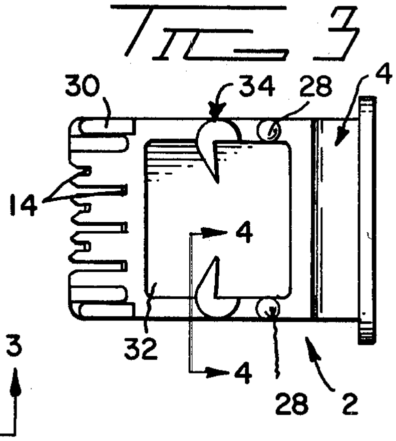
FIG. 4
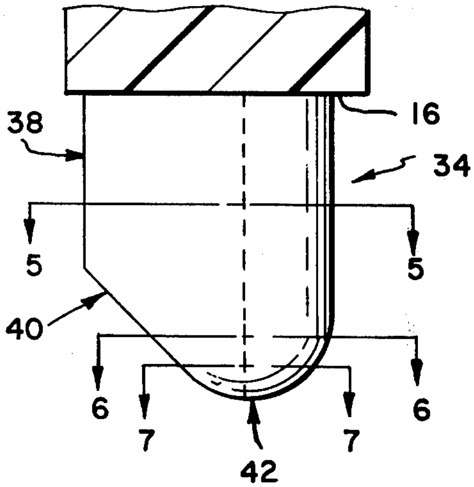
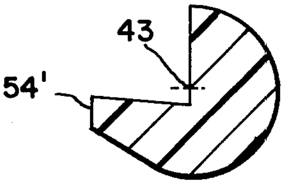
FIG. 6
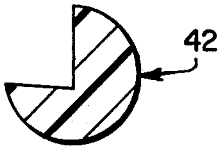
FIG. 7
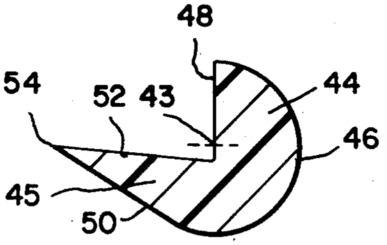
FIG. 5
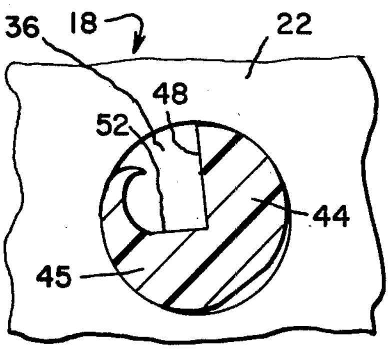
FIG. 10

TERMINAL HOUSING HAVING IMPROVED MOUNTING MEANS

FIELD OF THE INVENTION

This invention relates to electrical connectors which are intended for mounting on a circuit board and particularly to improved mounting means for such connectors.

BACKGROUND OF THE INVENTION

In the manufacture of electronic equipment, it is frequently required that electrical connectors be mounted on a circuit board, the connectors having solder tabs extending therefrom which are received in solder tab holes in the circuit board and then soldered to conductors on the underside of the circuit board. It is common practice to assemble the connectors to the circuit boards at one stage of an assembly process and at a later time to solder the solder tab to the circuit board conductors in a wave soldering apparatus. It is desirable to provide a means on the connector housing for holding the housing on the circuit during the interval between assembly of the housing to the circuit board and soldering of the tabs to the circuit board conductors.

A variety of mounting means for such connectors are currently being used. For example, it is common practice to provide latch arms having opposed shoulders on the housing which shoulders bear against the oppositely facing surfaces of the circuit board. It is also common to provide tapered posts on the housing or spring fingers which are flexed towards each other when they are inserted into holes in the circuit board.

These known methods are not satisfactory for many purposes, primarily for the reason that they are not adaptable to circuit boards of varying thickness. The manufacturing tolerances for circuit boards, as regards board thickness, is quite generous and a mounting means such as a latch arm arrangement may be satisfactory for a board having a predetermined nominal thickness but it would not be capable of holding the housing firmly on the board if the board thickness were significantly greater than or less than the nominal thickness. A tapered post type mounting means is unsatisfactory for the reason that the post-receiving holes in the circuit board will vary within manufacturing dimensional tolerances and a given post may not be satisfactory for post holes having variations in hole diameter which are within these tolerances.

Ideally, the mounting means for a housing should be such that the housing is held snugly against the surface of the board regardless of the board thickness (within the tolerance limits) and the diameter of the hole in the circuit board which receives the post. Some of the available mounting means are capable of holding the housing in the board loosely but it is preferable to have precise positioning of the housing on the circuit board. The present invention is directed to the achievement of an improved mounting means which is capable of holding a housing on a circuit board with a surface of the housing against the surface of the circuit board and which is not sensitive to variations in circuit board thickness or post hole diameter.

In accordance with the invention, a pair of spaced-apart mounting posts extend axially from the surface of the connector housing which is disposed against the surface of the circuit board when the housing is mounted thereon. Each post has a retaining portion which is immediately adjacent to the housing surface, an intermediate lead-in or guide portion, and a free end. The retaining portion is of uniform cross-section throughout its length and has a semi-cylindrical portion from which a retaining fin extends. This fin has an external surface which extends tangentially from the surface of the semi-cylindrical section and is capable of collapsing towards the flat surface of the semi-cylindrical portion. The intermediate or lead-in portion of the post has the semi-cylindrical section of the retaining portion and a fin which is of decreasing cross-section as the free end of the post is approached. The free end itself has a spherical surface, the radius of which is substantially equal to, and slightly less than, the radius of the post-receiving hole in the circuit board.

When the housing is to be assembled to the circuit board, the free ends of the posts are aligned with the post-receiving holes in the circuit board and the housing is then pushed towards the circuit board. As the intermediate portions of the posts move through the circuit board holes, the fins are flexed and the outer surfaces of the fins assume the curvature of the circuit board holes. After completion of the insertion step, the flexed fins bear resiliently against the walls of the circuit board holes and firmly retain the housing on the circuit board.

DESCRIPTION OF THE DRAWINGS

FIG. 1 is a frontal view of an electrical connector housing having mounting means in accordance with the invention.

FIG. 2 is a side view.

FIG. 3 is a view taken along the lines 3—3 of FIG. 2 of the bottom surface of the housing.

FIG. 4 is an enlarged view of a mounting post extending from the housing looking in the direction of the arrows 4—4 in FIG. 3.

FIGS. 5, 6, and 7 are views taken along the lines 5—5, 6—6 and 7—7 of FIG. 4.

FIG. 10 is a view taken along the lines 10—10 of FIG. 9 illustrating the manner in which the retaining fin holds the housing on the circuit board.

PRACTICE OF THE INVENTION

Figure 8:
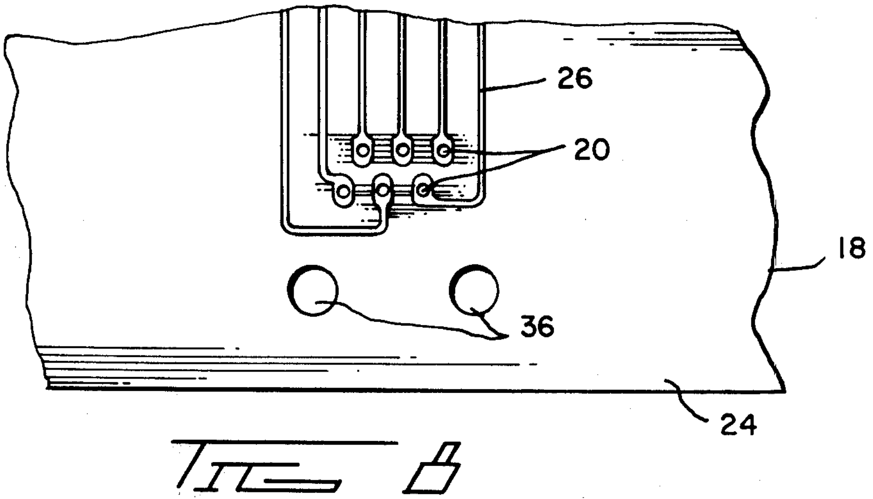
FIG. 8 is a plan view of one surface of a circuit board showing post-receiving holes for receiving terminal posts on a housing and terminal-tab receiving holes.
Figure 9:
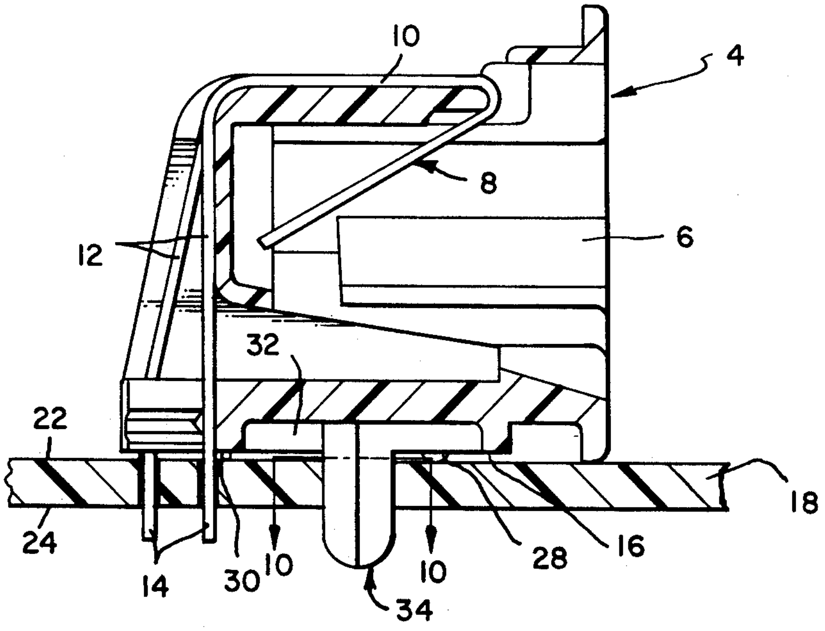
FIG. 9 is a side view of the housing in its assembled position on a circuit board.

The invention is herein disclosed on a connector 2 of the type more fully described in Application Ser. No. 014,442 and need be described here only to the extent necessary for an understanding of the present invention. The connector 2 comprises a housing 4 having a plug-receiving cavity 6 extending into one of its ends which is dimensioned to receive a complementary connector plug. A plurality of stamped and formed conductors 8 are mounted on the housing. These conductors comprise contact springs which extend into cavity 6 and portions which extend across the top and down the backwall as shown at 10 and 12. The ends of these stamped and formed conductors 14 extend beyond the bottom surface 16 of the housing and are inserted into holes 20 in the circuit board 18 when the housing is mounted on the circuit board. The holes 20 extend to conductors 26 on the underside or lower side 24 of the circuit board and are soldered to these conductors after the housing has been mounted on the upper side 22.

The disclosed housing 4 has standoff bosses 28, 30 which support the surface 16 of the housing slightly above the surface 22 of the circuit board and the lower surface of the housing has a central recess as shown at 32. The presence of this recess and the provision of the standoff bosses is of significance for reasons discussed below.

The housing is mounted on the circuit board by means of spaced-apart mounting posts 34 which are received in spaced-apart circular post-receiving holes 36. Each mounting post comprises retaining section 38 which is adjacent to the surface 16 of the housing, a free end 42 which is remote from the surface 16, and an intermediate guide section 40. The retaining section 38 is of uniform cross-section throughout its length and has a semi-cylindrical portion 44 from which a retaining fin 45 extends. The retaining section thus has a semi-cylindrical surface 46 which partially surrounds its axis 43, as indicated in FIG. 8 and a flat surface 48 which extends substantially through the axis 43. The laterally extending fin 45 has a first surface 50 which extends tangentially from the semi-cylindrical surface 46 on one side of the axis 43 and a flat surface 52 which extends from the surface 48 of the semi-cylindrical portion. Advantageously, the surface 52 intersects the surface 48 at a location between the axis 43 of the cylindrical portion 44 and the one end of the cylindrical portion rather than at the axis. This feature promotes folding of the fin when the posts 34 are inserted into the holes 36.

The two surfaces 50, 52 intersect at the outer edge 54 of the fin and this outer edge extends parallel to the axis 43 in the retaining portion 38 of the post. The semi-cylindrical portion 44 extends through the guide section 40 of the post as shown in FIG. 6, but the fin is of reduced cross-sectional area. The outer edge slopes towards the axis in this intermediate portion so that the cross-sectional area of the fin decreases as the free end is approached. Also, the edge 54′ has a flat surface in this guide section of the post.

The free end 42 has a conical surface which merges with the semi-cylindrical surface 46 and with the lower surface of the fin. The radius of this conical surface and the radius of the semi-cylindrical section 44 should be substantially equal to and slightly less than the diameter of the post-receiving holes 36.

In order to assemble the housing to the circuit board, the free ends 42 of the posts are aligned with the holes 36 and the housing 4 is then moved relatively towards the circuit board. It will be noted that the free ends 42 of the posts 34 extend beyond the outer or free ends of the terminal tabs 14 and the tabs do not, therefore, move against or into the holes 20 until the posts 34 are started in the holes 36 at which time the terminal tabs will be accurately aligned with the holes 20. As the terminal posts move into the holes 20, the fins 45 are curled progressively towards the surface 48 and assume the curvature of the holes as shown in FIG. 10. When the posts are fully inserted, fins 45 in the retaining portions 38 of the posts will be resiliently flexed and biased against the walls of the holes 36 thereby retaining the housing on the circuit board.

It is desirable to provide clearance adjacent to the surface 16 of the housing in order to permit unrestrained folding of the fins in the event that portions of the fins may be displaced upwardly and against the surface 16. An accumulation of displaced material from the fins would prevent seating of the surface 16 on the surface 22 of the circuit board. In the disclosed embodiment, the surface 16 is purposely held in spaced relationship to the surface 22 by the standoff bosses 28, 30 and these bosses therefore provide such clearance. Additionally, the recess 32 provides clearance.

The housing may be molded of any suitable material, such as an unfilled 6—6 nylon which is relatively rigid in thick sections but which can be deformed in thin sections to permit collapse and folding of the fins. The housing can be produced by conventional thermoplastic molding techniques and relatively simple coring used to provide the posts.

A mounting means in accordance with the invention is particularly advantageous in that it is almost totally insensitive to the thickness of the circuit board 18. Circuit boards cannot be produced to precise thicknesses; for example, boards having a nominal thickness of 0.062″ may have an actual thickness of from 0.055″ to 0.072″. Mounting posts in accordance with the invention can be used with circuit boards throughout this range so long as the retaining section 38 of each post is of a length sufficient to exert an adequate retaining force on the walls of the holes. Retaining posts in accordance with the invention are, furthermore, insensitive to the normal tolerance variations which are encountered in the diameter of the post-receiving holes 36. As mentioned above, the cylindrical portion of each post should have a radius which is equal to and slightly less than the minimum radius of the hole 36 and if this practice is followed, the posts will be received in all of the holes of a given nominal diameter which may be encountered in a manufacturing process.

In the foregoing description, the advantages of the invention are explained in terms of the need for a mounting means during manufacture of circuit boards and the importance of having a mounting means which will secure the housings to the circuit boards prior to soldering of the solder tabs to the circuit board conductors 26. After the soldering operation has been carried out, the soldered junctions provide a mechanical connection of the housing to the circuit board and many presently used housings rely on this soldered connection entirely. However, it is preferable to have a purely mechanical means of securing a housing to a circuit board in addition to the soldered connections. A mounting means in accordance with the invention provides a very effective mechanical securing means after the solder tabs have been soldered to the conductors and thereby contributes to the reliability of the connector. As mentioned above, the posts are tightly and firmly contained in the circuit board holes 36 so that it is virtually impossible to move the housing relative to the circuit board and it is therefore virtually impossible to impose a stress on the soldered connections between the solder tabs 14 and the conductors 26.

The soldering operation, which results in heating the lower ends of the mounting posts 34, does not destroy the mechanical connection to the circuit board and in fact may frequently enhance the retention qualities of the posts for two reasons. Heating of the lower portions of the posts will encourage the curled portions of the fin shown in FIG. 10 to return to its original shape and thereby increase the force the fin exerts on this side of the hole 36. Additionally, and if the solder path is maintained at a relatively high temperature, portions of the posts 34 adjacent to the underside 24 of the circuit board may be melted and flow laterally over the surface of the circuit board adjacent to the holes 36. Any such lateral flow would provide shoulders on the posts bearing against the circuit board.

I claim:

1. A molded thermoplastic housing containing electrical contact terminals, said housing having spaced-apart integral mounting means extending from one surface thereof which are intended for reception in circular holes in a circuit board to secure said housing to said circuit board, each of said mounting means comprising:

a mounting post extending from said one surface and having a free end which is spaced from said one surface, said mounting post comprising a semi-cylindrical portion and a collapsible retaining fin extending laterally from said semi-cylindrical portion, said semi-cylindrical portion having an axis which extends normally of said one surface, having a flat surface which extends parallel to said axis, and having a semi-cylindrical surface which surrounds said axis, said semi-cylindrical portion having a uniform cross-section along its entire length from said one surface to said free end, said mounting fin having a first surface which extends tangentially from said semi-cylindrical surface on one side of said axis and a second surface which extends from said flat surface adjacent to said axis, said mounting fin having an outer edge which is defined by the intersection of said first and second surfaces, said outer edge extending parallel to said axis from said one side to an intermediate location on said post, said outer edge sloping towards said axis between said intermediate location and said free end whereby said fin has a uniform cross-section between said one side and said intermediate location and has a diminishing cross-section between said intermediate location and said free end whereby, upon inserting said mounting posts into circular holes in a circuit board which holes have a diameter which is substantially equal to, and greater than, the diameter of said semi-cylindrical portion of said posts and substantially less than the maximum width of said mounting posts, said retaining fins will be progressively flexed towards said flat surface of said semi-cylindrical portion and said fins will resiliently bear against the walls of said holes and retain said housing on said circuit board.

2. A molded thermoplastic housing as set forth in claim 1, said free end of each of said posts having a spherical surface, said semi-cylindrical surface and said first surface of said fin merging with said spherical surface.

3. A molded thermoplastic housing as set forth in claim 2, said housing having two of said mounting posts extending from said one surface.

4. A molded thermoplastic housing containing electrical contact terminals, said terminals having solder tabs extending normally from one surface of said housing, said housing being intended for mounting on one side of a circuit board having tab-receiving holes therein for reception of said solder tabs and having conductors on the other side of said board extending to said tab-receiving holes, said housing having at least two spaced-apart integral mounting means extending from said one surface which are intended for reception in circular mounting holes in said circuit board, each of said mounting means comprising:

a mounting post extending from said one surface and having a free end which is spaced from said one surface, said mounting post comprising a semi-cylindrical portion and a collapsible retaining fin extending laterally from said semi-cylindrical portion, said semi-cylindrical portion having an axis which extends normally of said one surface of said housing, having a flat surface which extends parallel to said axis, and having a semi-cylindrical surface which partially surrounds said axis, said semi-cylindrical portion having a uniform cross-section along its entire length from said one surface to said free end, said mounting fin having a first surface which extends tangentially from said semi-cylindrical surface on one side of said axis and a second surface which extends from said flat surface adjacent to said axis, said mounting fin having an outer edge which is defined by the intersection of said first and second surfaces, said outer edge extending parallel to said axis from said one side to an intermediate location on said post, said outer edge sloping towards said axis between said intermediate location and said free end whereby said fin has a uniform cross-section between said one side and said intermediate location and has a cross-section of diminishing size between said intermediate location and said free end, said solder tabs having free ends which are spaced from said one surface by a distance which is less than the distance between said one surface and said free ends of said mounting posts, whereby upon inserting said mounting posts into circular holes in a circuit board which holes have a diameter which is substantially equal to, and greater than, the diameter of said semi-cylindrical portion of said posts and substantially less than the maximum width of said mounting posts, said retaining fins will be progressively flexed towards said flat surface of said semi-cylindrical portion and said fins will resiliently bear against internal surfaces of said holes and retain said housing on said circuit board, and said free ends of said mounting posts will be located beyond said free ends of said solder tabs.

5. A housing as set forth in claim 4, said free end of each of said mounting posts comprising a spherical surfaces having a radius which is equal to the radius of said semi-cylindrical surface.

6. A housing as set forth in claim 5 having standoff bosses on said one surface, said standoff bosses supporting said housing with said one surface spaced from said one side of said circuit board.

7. A circuit board having an electrical connector mounted on one side thereof, said connector comprising an insulating housing having contact terminals therein, one surface of said housing being against said one side of said circuit board, said terminals having solder tab portions extending normally from said one surface of said housing and through tab-receiving holes in said circuit board, said tabs having free ends which are soldered to conductors on the other side of said circuit board, and mounting and securing means on said housing and extending into circular holes in said circuit board, said mounting and securing means comprising:

a mounting post extending from said one surface of said housing and into its associated circular hole, said mounting post comprising a semi-cylindrical portion having an integral mounting fin extending laterally therefrom, said semi-cylindrical portion having an axis which extends normally from said one surface of said housing, having a semi-cylindrical surface which partially surrounds said axis, and having a flat surface which extends substantially through said axis, said semi-cylindrical portion having a radius which is substantially equal to, and less than, the radius of said circular hole, said mounting fin having one surface which extends tangentially from said semi-cylindrical surface on one side of said axis, and having a second surface which extends from said flat surface, said first and second surfaces intersecting at the outer edge of said fin, said fin being resiliently collapsed in said circular hole with said first surface extending around the wall of said hole and with said second surface against said flat surface, said resiliently collapsed fin exerting retention forces against the walls of said circular hole and maintaining said housing on said circuit board.

8. The combination of a circuit board and a connector as set forth in claim 7, each of said mounting posts having a free end which extends beyond said other side of said circuit board and beyond said free ends of said solder tab portions.

9. The combination set forth in claim 8, said mounting and securing means comprising a pair of said mounting posts.

* * * * *